United States Patent [19]

Balazs et al.

[11] 4,387,733
[45] Jun. 14, 1983

[54] DUAL FULCRUM STEAM TRAP

[75] Inventors: Les Balazs, Brecksville; Michael E. Winiasz, Lorain, both of Ohio

[73] Assignee: The Clark Reliance Corp., Cleveland, Ohio

[21] Appl. No.: 265,340

[22] Filed: May 19, 1981

[51] Int. Cl.³ .............................................. F16T 1/30
[52] U.S. Cl. ..................................... 137/185; 137/448
[58] Field of Search ................................ 137/185, 448

[56] References Cited
U.S. PATENT DOCUMENTS 2,025,752 12/1935 Kaye ..................................... 137/185
2,637,335 5/1953 Goff ..................................... 137/185

Primary Examiner—Alan Cohan
Attorney, Agent, or Firm—Yount & Tarolli

[57] ABSTRACT

A steam trap of the type having a dual fulcrum lever. A planar surface on which the fulcrums pivot is integral with the valve orifice, and as a result the spacing between the valve orifice and the pivot plane can be easily controlled.

9 Claims, 8 Drawing Figures

DUAL FULCRUM STEAM TRAP

BACKGROUND OF THE INVENTION

The present invention relates to steam traps, and in particular the present invention relates to float-type steam traps in which a float is connected with a valve member by a lever.

Many prior art float-type steam traps have been built in which a valve member is connected to a pivotable lever to move the valve member into and out of engagement with an orifice in the valve seat. It has previously been recognized that it is necessary to provide a relatively high mechanical advantage between the float and the valve member to make the initial movement of the valve member away from the orifice against the pressure of steam within the trap. To achieve this the distance between the pivot point of the lever and the valve member has been minimized while the distance between the pivot point of the lever and the float has been maximized. Lengthening the later distance means that the overall size of the trap including its relatively massive housing must be increased. Obviously, a steam trap with a high mechanical advantage but a small size is more economical to produce and lighter and therefore easier to install.

Moreover, instead of having a hinged connected between the lever and the valve seat, it has proved advantageous to permit the valve member to be self-centering in the valve seat. To accomplish this the lever is provided with one or more fulcrums about which it can pivot, and the fulcrums pivot against a flat surface which is fixed with respect to the valve seat. A bracket holds the lever and valve member relatively near the valve seat and keeps the lever, valve member, and float from falling down in the trap when the valve is wide open. With this arrangement the valve member can be self-centering in the valve orifice.

In several prior art devices the lever has been provided with two fulcrums, one to provide high mechanical advantage for initial movement of the valve member away from the valve seat and another to provide for subsequent rapid movement of the valve member. These dual fulcrum mechanisms can open a valve upon only a slight change in the bouyancy of the bucket because of the high initial mechanical advantage. After the initial movement, large forces are not required to move the valve further open. The dual fulcrum mechanisms thus effect early and rapid complete opening of the valve. This reduces errosion of the valve seat known as wire draw which is caused by high speed steam flowing through a small opening.

In one of the dual fulcrum devices the fulcrum for high mechanical advantage pivots on a surface of a bracket which is secured to the valve seat. The pivot surface is in a plane which is parallel with the orifice in the valve seat and which includes a diameter of the hemispherical valve member when the valve member is seated in the orifice. This trap has a very high mechanical advantage for initial opening of the trap because the distance between the fulcrum and the centerline of the valve seat is relatively small. Such a device is disclosed in U.S. Pat. No. 2,637,335 and is illustrated schematically in FIG. 2.

Although this type of steam trap operates satisfactorily, it is necessarily expensive and difficult to produce. Parts must be manufactured within tight tolerances if the pivot surface is to be properly located. A deviation from ideal dimensions in the bracket can combine with a deviation from ideal dimensions in the valve seat to result in a steam trap which is not marketable. The cumulative effect of "stackup" of inaccuracies can be overcome only by holding very tight tolerances in the manufacture of each component, and this is costly.

Another prior art device (illustrated in FIG. 1) uses a dual fulcrum lever which pivots on a plane which defines the valve orifice. This arrangement eliminates the stack up of tolerances problem, but also limits the maximum mechanical advantage obtainable. If the high leverage fulcrum is to pivot on the plane of the orifice, it cannot be located closer to the centerline of the valve seat than a distance equal to the radius of the hemispherical valve member. If the fulcrum is moved closer than that minimum, valuable movement of the float is wasted because it merely causes the valve member to rotate in the valve orifice rather than lift away from it.

SUMMARY OF THE INVENTION

The present invention provides a steam trap having a dual fulcrum lever which provides a relatively large initial mechanical advantage in a structure that is both simple to manufacture and long lasting. The high leverage fulcrums of the lever are close to the centerline of the valve orifice to provide a high initial mechanical advantage. The fulcrums pivot on a planar pivot surface which is integral with the valve seat and spaced from the valve orifice and which lies in a plane of the diameter of the valve member when the valve member is seated against the orifice in the valve seat. The planar surface on which the fulcrums pivot is integral with the valve orifice, and as a result the spacing between the valve orifice and the pivot plane can easily be controlled. The pivot surface is relatively broad so that the fulcrums make contact across a relatively large area, reducing wear and extending the operating life of a steam trap constructed in accordance with the present invention.

According to the present invention a valve seat has an essentially circular orifice adopted to sealingly receive a hemispherical valve member. The valve seat also has an annular surface surrounding the orifice on which the fulcrum tips of the lever pivot. The pivot surface is coaxial and parallel with the orifice but is axially displaced from the orifice. In effect, the orifice is countersunk from the plane of the pivot surface. The distance between the orifice and the pivot surface is selected so that, when the hemispherical valve member is engaged with the orifice, a diameter of the hemisphere lies in the plane of the pivot surface. This permits the high leverage fulcrum to be moved as close as desired to the centerline of the valve orifice without causing excessive sweep.

The pivot surface is an integral part of the valve seat, and consequently it is relatively easy to keep the distance between the orifice and pivot surface within a tight tolerance. The lever and valve member must still be made with a fair degree of accuracy, but this is true of all lever-type steam traps.

Elimination of the bracket used in prior art devices means that a steam trap may be made more consistently to an acceptable performance standard at a reduced cost because there is no stackup of tolerances. Moreover, in the present design the fulcrum tips of the lever pivot on the pivot surface of the valve seat which is relatively broad when compared with the surfaces in the prior art bracket. Contact across a broader surface means reduced wear, hence steam traps embodying the present invention have an extended operating life.

BRIEF DESCRIPTION OF THE DRAWINGS

These and other advantages and features of the present invention will become apparent from reading the following specification when taken together with the accompanying drawings which form a part thereof and in which.

DESCRIPTION OF PREFERRED EMBODIMENT

Figure 1:
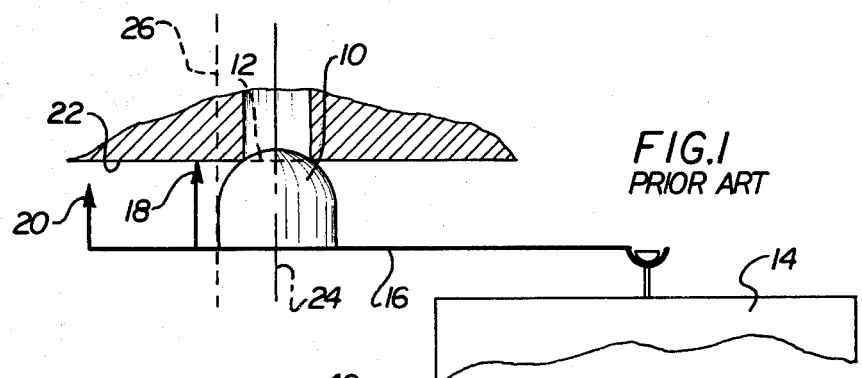
FIG. 1 is a schematic illustration of a prior art steam trap.

FIG. 1 illustrates a prior art float-type steam trap which includes a hemispherical valve member 10 which seats in a circular orifice 12. The valve member 10 is connected with a float 14 by means of a dual fulcrum lever 16. The lever 16 has two fulcrums 18 and 20 which pivot against a pivot surface 22 coplanar with the orifice 12. Although the mechanism illustrated in FIG. 1 is satisfactory, it is not practical to increase the mechanical advantage for initial opening of the valve beyond a certain limit. It is not practical to move the fulcrum 18 closer to the center line 24 of the hemispherical valve member 10 than the line indicated by numeral 26 which indicates a plane parallel to the center line 24 and spaced from it by a distance equal to the radius of the hemispherical valve member 10. If the pivot point 18 is moved closer than the plane 26, rotation of the lever 16 will cause the valve member 10 to lift from its seat only after an undesirably large amount of rotation or "sweep" of the valve member 10 in the seat 12. Some of this type of rotation is necessary to keep the orifice and seat clean, but excess sweep wastes valuable float travel and thus impedes making a compact trap.

Figure 2:
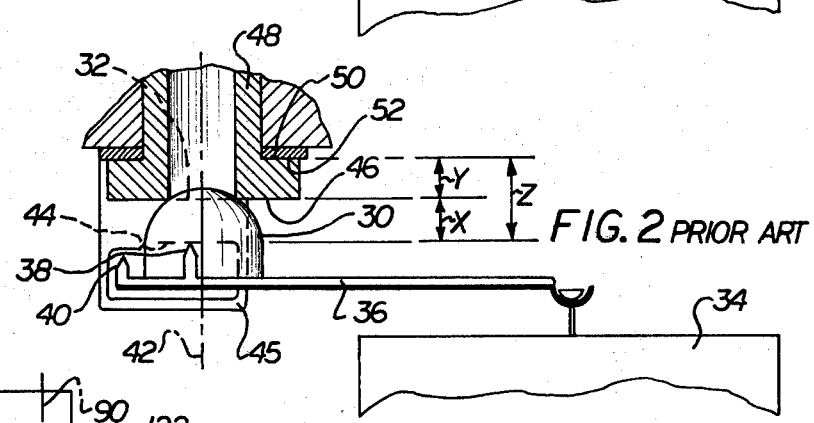
FIG. 2 is a schematic illustration of a prior art steam trap.

A solution which provides limited sweep and higher mechanical advantage for initial opening of a valve member away from its seat is disclosed in U.S. Pat. No. 2,637,335 issued to Goff and illustrated schematically in FIG. 2. Goff shows a stream trap in which a hemispherical valve member 30 is adapted to engage a circular orifice 32. A float 34 is connected by a dual fulcrum lever 36 with the valve member 30. The dual fulcrum lever 36 has two fulcrums 38 and 40. The fulcrum 38 which provides for high mechanical advantage during initial opening of the valve member 30 away from the orifice 32 is spaced from the center line 42 by substantially less than the radius of the hemispherical valve member 30. However, because the fulcrum 38 pivots on a surface 44 which is parallel with the plane of the orifice 32 and which also includes the diameter of the hemispherical valve member 30, rotation of the valve member 36 about the fulcrum 38 lifts the valve member 30 away from the orifice 32 rather than simply causing the valve member to sweep inside the orifice.

Although steam traps following the design shown in the Goff patent are satisfactory, they are relatively expensive to construct. The distance between the plane of the orifice 32 and the parallel surface 44 against which the fulcrum 38 rests must be carefully controlled. However, as taught by Goff, the surface 44 is part of a bracket 45, and the location of the surface 44 can be controlled only by controlling two separate distances. First the distance between the top 46 of the valve seat 48 and the bottom 50 of the valve seat (indicated by distance Y) must be controlled, and second the distance between the top 52 of the bracket and the surface 44 in the bracket (indicated by the distance Z) must be controlled. The distance between the top 46 of the valve seat 48 and the surface 44 of the bracket 45 (indicated by the distance X) is what ultimately must be kept within acceptable tolerances. However, the distance can be controlled only by controlling distances Y and Z. If, during manufacture a valve seat 48 which has a distance Y which is slightly undersized is assembled with a bracket 45 in which the distance Z is oversized, the position of the plane 44 in the bracket could easily be outside acceptable limits. For this reason it has been necessary to maintain very tight manufacturing tolerances on the distances Y and Z so that their cumulative effect on the distance X will always remain within an acceptable range.

According to the present invention this stackup of tolerances can be eliminated by forming a plane on which the fulcrums of the lever pivot as an integral part of the valve seat. This not only reduces the manufacturing costs but also enables the production of steam traps of consistently higher quality than was previously possible.

Figure 3:
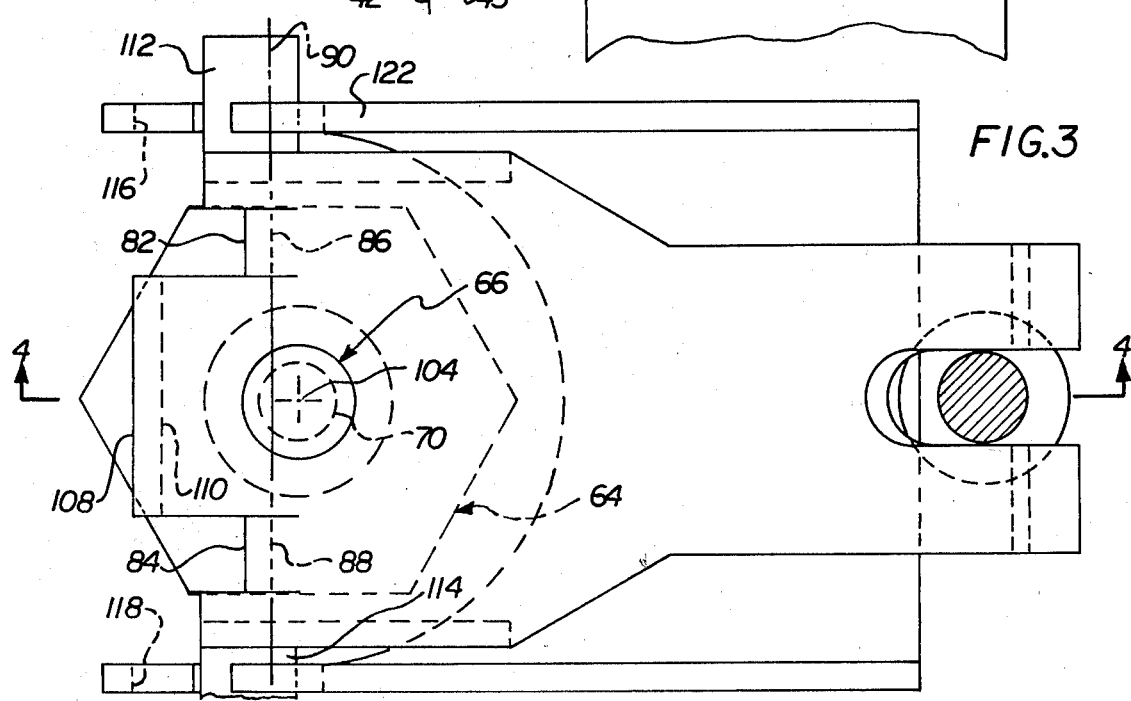
FIG. 3 is a plan view of a portion of a steam trap constructed in accordance with the present invention.
Figure 4:
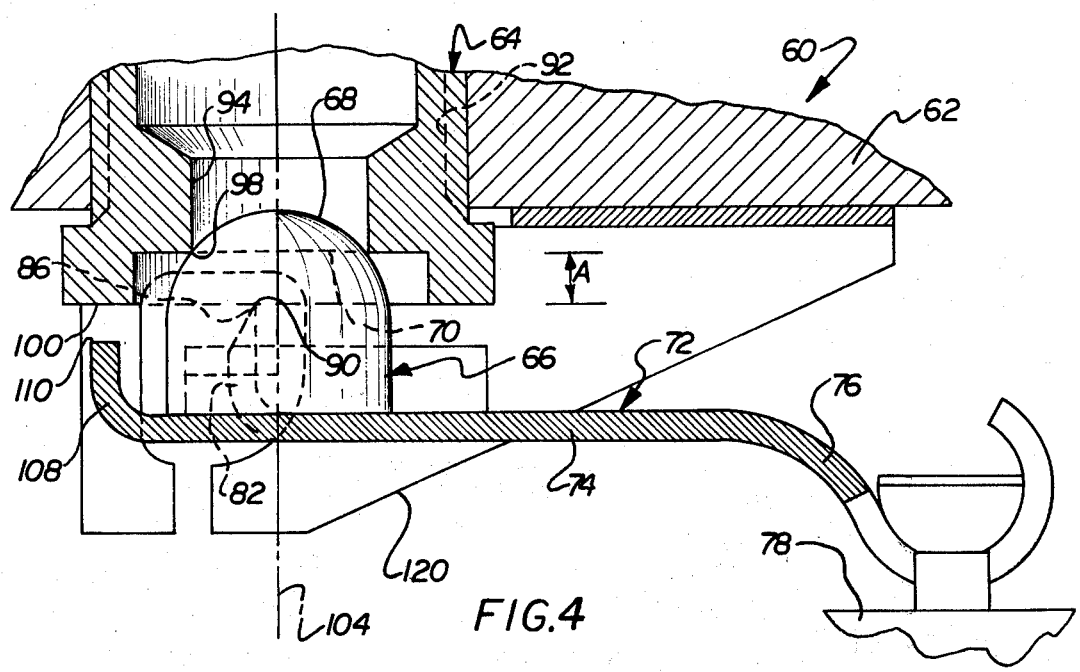
FIG. 4 is a section view taken along line 4—4 of FIG. 3.

The present invention resides in an improvement on the float-type steam trap of the sort described in International Organization For Standardization Publication entitled "Automatic Steam Traps-Classification", ISO/DP 6704, July 1979. The steam trap 60 (FIGS. 3 and 4) constructed according to the present invention includes a housing 62, a valve seat 64, and a valve member 66 having a hemispherical surface 68 which is adapted to sealingly engage a generally circular orifice 70 in the valve seat. Although the valve member 66 has a hemispherical surface 68, it is contemplated that other convexly curved or conical surfaces could also be used in practicing the present invention. The hemispherical surface 68 has a diameter larger than the diameter of the orifice 70 so that when seated, no diametrical plane of the hemispherical surface 68 lies in the plane of the orifice. Movement of the valve member 66 into and out of sealing engagement with the orifice 70 controls the flow of fluid out of the steam trap 60.

A lever 72 has an axially extending body portion 74. One end portion (76) of the lever 72 is hook-like for connecting the lever with a float 78. The float 78 which is illustrated is an inverted bucket type of float which moves vertically in response to the level of condensate within the float. However, it is contemplated that any of other type of floats such as those described in ISO/DP 6704 mentioned above could also be utilized.

The valve member 66 is fixedly connected with the lever 72, and the lever has a pair of tabs 82 and 84 (FIG. 3) which have surfaces defining axially extending fulcrum tips 86 and 88. The tabs 82 and 84 are bent so that the fulcrum tips 86 and 88 are coaxial and define the axis 90 about which the lever 72 rotates during initial opening movement of the valve member 66 away from the orifice 70.

The housing 62 (FIG. 4) has a threaded orifice 92 in which the valve seat 64 is received. The valve seat 64 has a central cylindrical passage 94 one end of which forms the generally circular orifice 70 against which the hemispherical surface 68 of the valve member 66 seats. The corner 98 is shown as being a square corner, but it could also be broken at a 45 degree angle or some other angle.

The valve seat 64 includes pivot surface 100 against which the fulcrum tips 86 and 88 bear. The pivot surface 100 is parallel to and spaced from a plane defined by the orifice 70. The pivot surface 100 is planar and positioned to define a plane which also includes a diameter of the hemispherical surface 68 of the valve member 66 when the valve member is in sealing engagement with the orifice 70.

Because the pivot surface 100 is integrally formed with the valve seat 64 of which the orifice 70 forms a part, it is a relatively simple matter to maintain the distance between the plane of the pivot surface 100 and the plane of the orifice 70 within a desired tolerance. Moreover, the stepped configuration provides improved flow characteristics because the resistance to flow through a stepped orifice is less than the resistance to flow through a sharp edged inlet.

The tabs 82 and 84 of the lever 72 are bent so that the fulcrum tips 86 and 88 extend transverse to the body portion 74 of the lever 72 up to (as viewed in FIG. 4), or nearly up to, the pivot surface 100 of the valve seat 64 when the valve member is seated.

Figure 6:
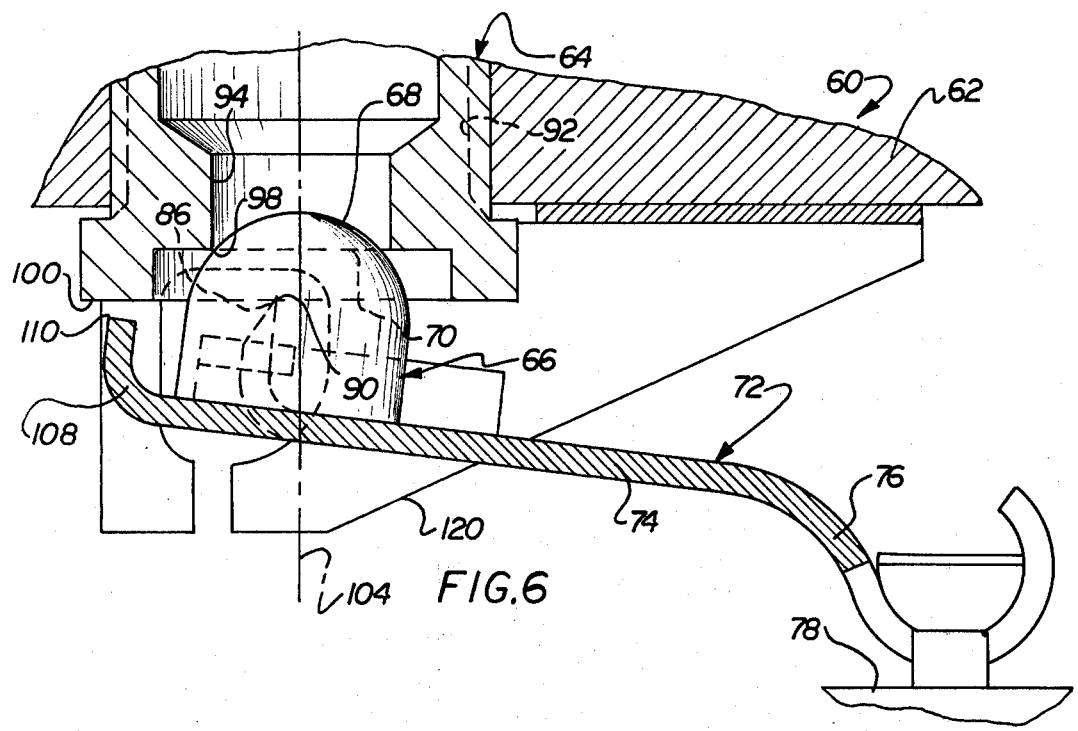
FIG. 6 is generally similar to FIG. 4 but shows a valve member moved a small distance away from its seat.

The two tabs 82 and 84 (FIG. 3) straddle the valve member 66, and during initial movement of the valve member 66 away from the seat 64 the tips 86 and 88 contact the pivot surface 100 along their entire length. During initial pivoting movement of the lever 72 (FIG. 6) in response to downward movement of the float 78, the lever 72 pivots around the fulcrum tips 86 and 88 which are positioned so that the shortest distance between the axis 90 and the center line 104 (as viewed in FIG. 4) is less than the radius of the hemispherical portion 68 of the valve member 66. This provides a relatively high mechanical advantage during initial movement of the valve member. Because the fulcrum tips 86 and 88 make contact over their entire length, wear is reduced to a minimum, especially as compared with the structure taught by Goff in which the corresponding fulcrum tips 38 rest on the edge of a stamped bracket. The increased area over which wear is distributed in the steam trap of the present invention results in an extended operating life.

The lever 72 includes a third tab 108 (FIG. 4) which has a fulcrum tip 110 about which the lever 72 pivots during movement of the lever subsequent to the initial movement away from the orifice 70. The tab 108 is formed at the axially opposite end of the lever 72 from the portion 76 which engages the float 78. Between the tab 108 and the float 78 along the length of the lever 72 are, first, the tabs 82 and 84 and then the center line 104 of the valve member 66.

Figure 7:
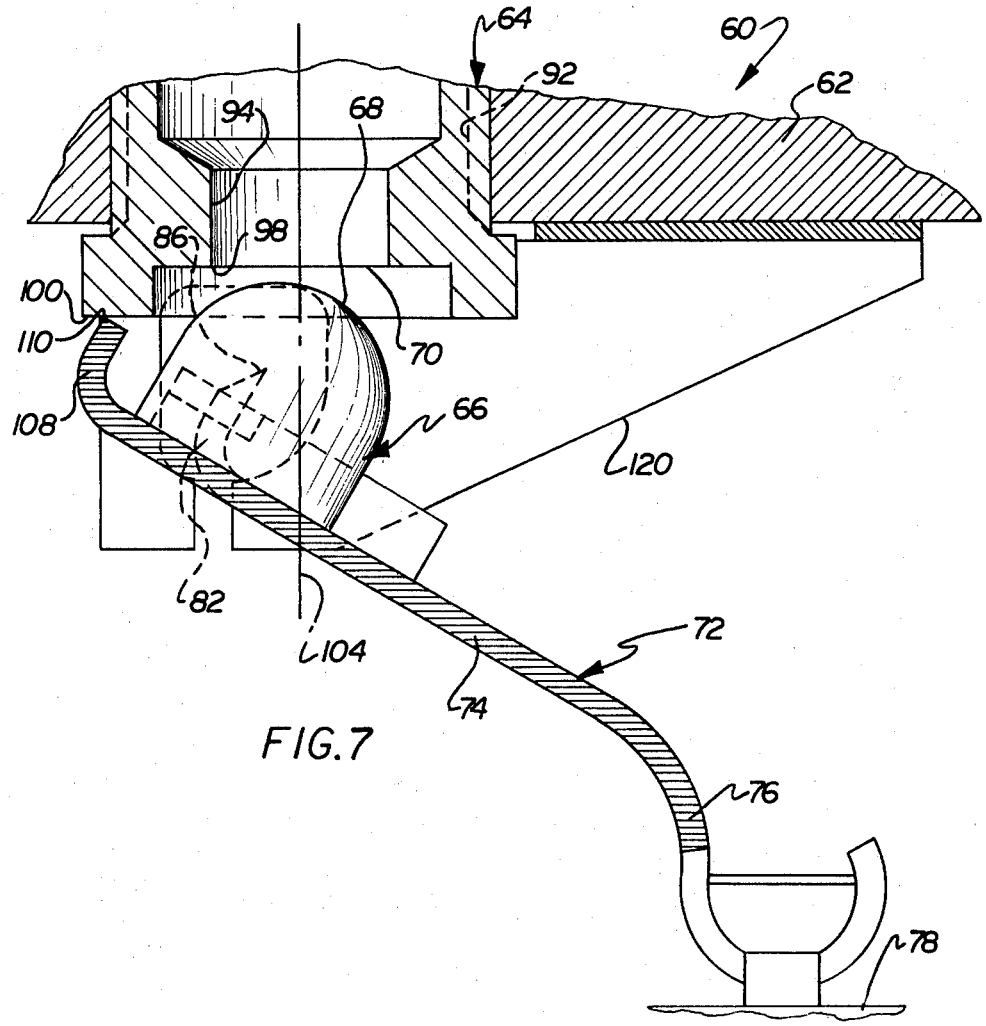
FIG. 7 is generally similar to FIG. 6 but shows the valve member moved a larger distance away from its seat.

The fulcrum tip 110 of the tab 108 does not extend upward (as viewed in FIG. 4) from the axially extending body portion 74 of the lever 72 as far as do the fulcrum tips 86 and 88. For this reason, the fulcrum tip 110 does not engage the pivot surface 100 until after the lever 72 has undergone initial movement (FIG. 7), rotating about the fulcrum tips 86 and 88. Because the fulcrum tip 110 is spaced farther from the centerline 104 of the valve member 66, rotation about the tip 110 provides a lower mechanical advantage than rotation about the tips 86 and 88, and therefore provides for rapid opening of the trap.

A bracket 120 serves to retain the lever 72 in proximity to the valve seat 64 while still allowing the valve member to be self-centering and the lever to pivot about two different axes. The bracket 120 may be fastened to the housing 62 of the trap 60 in any suitable manner. Specifically, it is contemplated that the bracket 120 could be secured to the housing 62 by suitable threaded fasteners (not shown), or the bracket could be spot welded in place. In either event, the bracket 120 includes a pair of side portions 122 and 124 which extend on either side of the pivot surface 100 of the valve seat 64.

Figure 5:
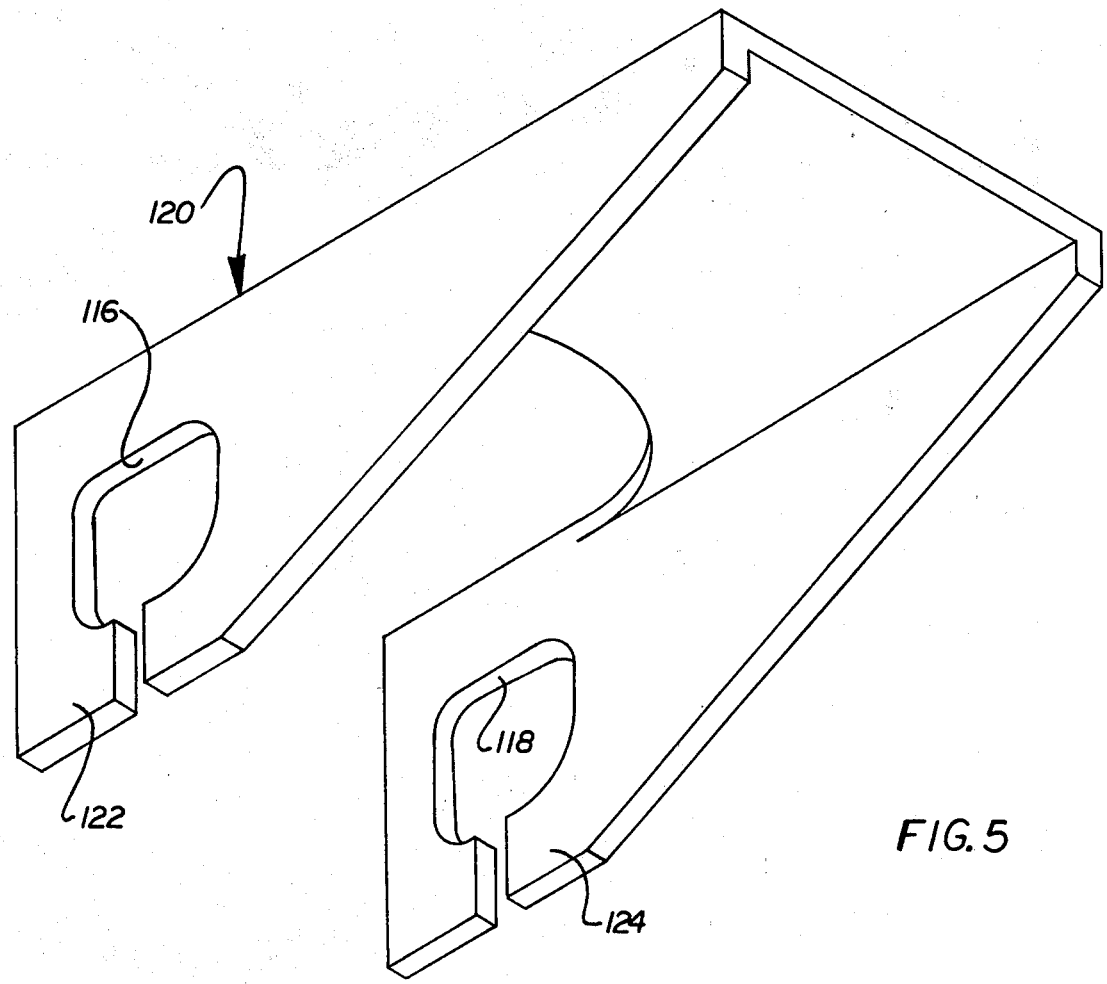
FIG. 5 is a perspective illustration of a bracket shown in FIGS. 3 and 4.

The lever 72 includes a pair of laterally extending tabs 112 and 114 (FIG. 3) which are received in openings 116 and 118 (FIGS. 3 and 5), respectively, of bracket 120. The tabs 112 and 114 cooperate with the bracket 120 to retain the lever 72 in the proper position.

Figure 8:
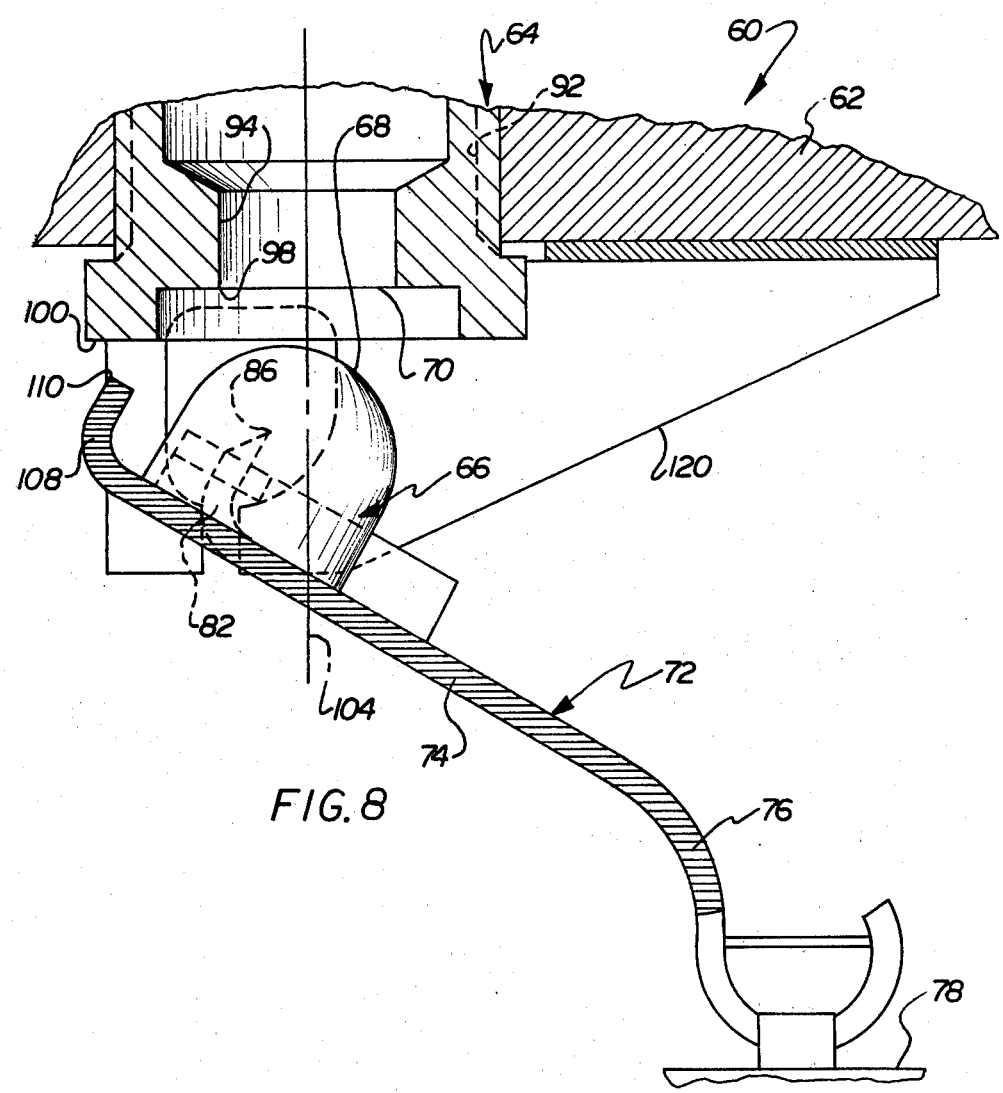
FIG. 8 is generally similar to FIG. 7 but show the valve member moved a still larger distance from its seat.

In order to make the valve member 66 self-centering in the orifice 70, the openings 116 and 118 in the bracket 120 are contoured so that the tabs 112 and 114 are free of contact with the openings when the valve member is closed. Moreover, the tabs 112 and 114 do not contact any part of the openings 116 and 118 in the bracket 120 during initial movement of the valve member 66 away from the orifice 70 while the lever is pivoting around the fulcrum tips 86 and 88 (see FIG. 6), nor do the tabs 112 and 114 contact the edges of the openings 116 and 18 while the lever is pivoting about the fulcrum tip 110 (see FIG. 7). It is only when the valve member is completely displaced from the orifice and gravity has pulled the fulcrum tip 110 away from the pivot surface 100 that the tabs 112 and 114 catch the lever 72 and prevent it from falling downward into the trap (see FIG. 8).

On the return, upward stroke of the float 14, the float contacts the lever 72 and pushes it and the valve member 66 toward the valve seat 64. The bracket 120 and tabs 112 and 114 cooperate to keep the valve member close enough to the valve seat that the vacuum created by fluid rushing through orifice 70 will draw the valve member into engagement with the seat.

Thus, it is clear that the present invention provides an improved float-type steam trap 60 in which a valve member 66 moves into and out of sealing engagement with an orifice 70 in a valve seat 64. The valve member 66 is connected to a lever 72 which pivots to move the valve member between open and closed positions. The lever 72 includes a pair of tabs 82 and 84 straddling the valve member 66 and extending transverse to the longitudinal axis of the lever. The lever 72 pivots about the tips 86 and 88 of the tabs which contact a planar surface 100 of the valve seat 66 as the lever 72 moves. This construction is substantially easier to manufacture than the prior art structures because the lever 72 pivots on a plane integral with the valve seat 66 rather than on a surface 44 (FIG. 2) of a separate bracket. In a steam trap 60 constructed in accordance with the present invention, there is no stackup of tolerances.

According to the present invention, the valve seat 64 has an essentially circular orifice 70 adapted to sealingly receive a hemispherical surface 68 of a valve member 66. A pivot surface 100 for the tips 86 and 88 of the tabs 82 and 84, respectively, of the lever 72 is an integral part of the valve seat 64. The pivot surface 100 surrounds the orifice 70 and is parallel to a plane defined by the orifice 70 but displaced therefrom. In effect, the orifice 70 is countersunk from the plane of the pivot surface 100. The distance between the orifice 70 and the pivot surface 100 is selected so that, when the valve member 66 is in sealing engagement with the orifice 70, a diameter of the hemispherical surface 68 of the valve member 66 lies in the plane of the pivot surface 100.

The pivot surface 100 is an integral part of the valve seat 64, and consequently it is relatively easy to hold a tight tolerance for the distance between the plane of the orifice 70 and the plane of the pivot surface 100. Moreover, in the present design the tips 86 and 88 of the lever tabs pivot on pivot surface 100 which is relatively large when compared with the surfaces in the prior art bracket. Contact across the broader surface means reduced wear, and hence steam traps embodying the present invention have an extended operating life.

What is claimed is:

1. A steam trap comprising a housing, a valve seat disposed in said housing and having a first circular orifice therethrough, a valve member having a hemispherical surface, said valve member being movable between a first position in which said hemispherical surface of said valve member sealingly engages said first orifice in said valve seat to block the flow of fluid through said first orifice and a second position in which said valve member is free of contact with said valve seat, said valve seat having a second circular orifice concentric with said first orifice and axially spaced therefrom, and said valve seat including pivot surface means integral with said valve seat and disposed in the diametrical plane of said hemispherical surface of said valve member which plane when said hemispherical surface of said valve member sealingly engages said first orifice passes through said second orifice, float means movable in response to changing condensate level, pivotable dual fulcrum lever means connecting said valve member and said float means for providing a relatively high mechanical advantage during initial movement of said valve member away from said valve seat and relatively lower mechanical advantage during subsequent movement of said valve member away from said valve seat, said dual fulcrum lever means including first fulcrum surface means for contacting said pivot surface of said valve seat during initial movement of said valve member away from said valve seat and second fulcrum surface means for contacting said pivot surface of said valve seat during movement of said valve member away from said valve seat subsequent to said initial movement.

2. A steam trap as set forth in claim 1 wherein said lever means includes an axially extending body portion, float connecting means for connecting said float means with one axial end portion of said body portion, first and second fulcrum portions extending transverse to said axially extending body portion of said lever means, said second fulcrum portion including said second fulcrum surface means and extending from said body portion at an axial location opposite from said float connecting means, said first fulcrum portion including said first fulcrum surface means and extending from said body portion at an axial location between said second fulcrum portion and said float connecting means.

3. A steam trap as set forth in claim 2 wherein said valve member is connected with said body portion of said lever means between said first fulcrum portion and said float connecting means.

4. A steam trap as set forth in claim 3 wherein said valve member is connected with said body portion of said lever means spaced from said first fulcrum portion by an axial distance less than the radius of curvature of said hemispherical surface of said valve member.

5. A steam trap as set forth in claim 1 wherein said lever means rotates about a first axis when said first fulcrum surface means contacts said pivot surface means, there being a second axis perpendicular to the planes of said orifices and through the center of said orifices, the shortest distance between said first and second axes being less than or equal to the radius of said hemispherical surface of said valve member.

6. A steam trap comprising a housing, a valve controlling the flow of fluid from said housing, said valve including a valve seat disposed in said housing and having an essentially circular orifice therethrough, a valve member having a hemispherical portion adapted to sealingly engage said orifice, said hemispherical portion having a diameter greater than the diameter of said orifice, a float movable in said housing, lever means connected with said float and said valve member for moving said valve member into and out of engagement with said valve seat, said lever means having a first fulcrum about which said lever means rotates during initial movement of said valve member away from said valve seat, surface means integral with said valve seat and lying in the diametrical plane of said hemispherical portion of said valve member when said valve member is in engagement with said valve seat, said first fulcrum pivoting on said surface means during initial movement of said valve member out of engagement with said valve seat, and bracket means connected with said housing for retaining said lever means when said valve is open, said bracket means being spaced from said surface means and being free of contact with said valve seat.

7. A steam trap as defined in claim 6 wherein said lever means includes a second fulcrum which engages said surface means which lies in the diametrical plane of said hemispherical portion and about which said lever means rotates during movement of said lever means subsequent to initial movement of said valve member away from said valve seat.

8. A steam trap as defined in claim 7 wherein said valve seat is a one-piece member threaded into said housing, said valve seat including a second orifice concentric with said first orifice and through which said valve member projects when said valve member engages said circular orifice, and said surface means comprises an annular surface of said valve seat lying in said diametrical plane and said second orifice also lying in said diametrical plane.

9. A steam trap as defined in claim 7 wherein said bracket includes a pair of side portions located on opposite sides of said valve seat, said side portions having a pair of openings therein, said lever means including a pair of transversely extending tabs received in said openings, and said surface means integral with said valve seat is located between said side portions.

* * * * *